No. 776,033. PATENTED NOV. 29, 1904.
L. SCHÖNE.
GAS COOKING APPARATUS.
APPLICATION FILED JULY 21, 1904.
NO MODEL.
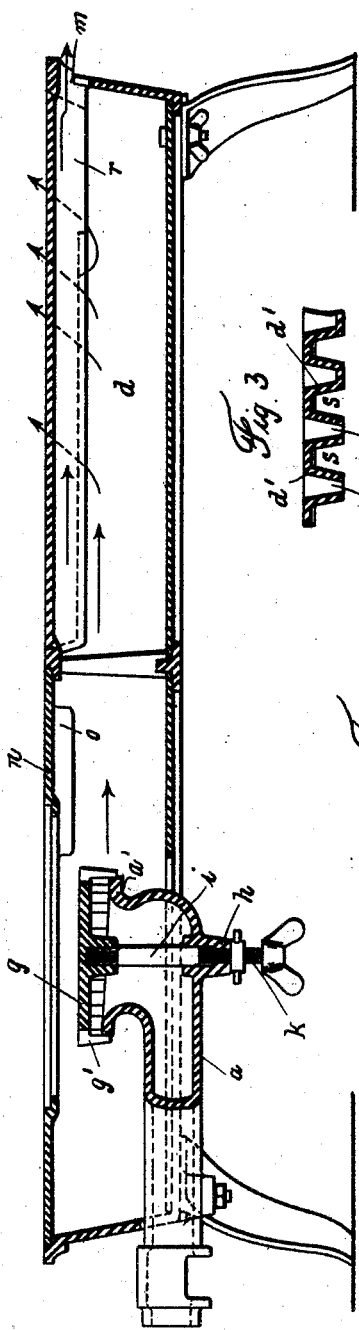
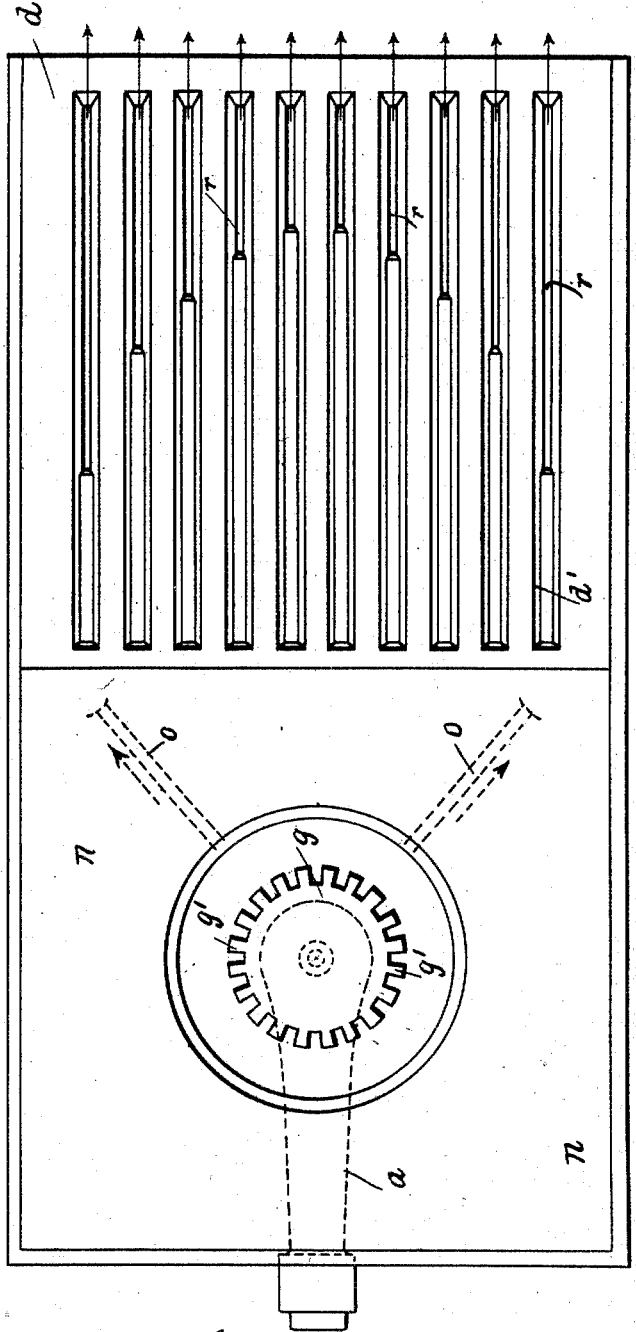

No. 776,033.

Patented November 29, 1904.

UNITED STATES PATENT OFFICE.

LOUIS SCHÖNE, OF DESSAU, GERMANY.

GAS COOKING APPARATUS.

SPECIFICATION forming part of Letters Patent No. 776,033, dated November 29, 1904.

Application filed July 21, 1904. Serial No. 217,520. (No model.)

*To all whom it may concern:*

Be it known that I, LOUIS SCHÖNE, a subject of the Emperor of Germany, residing at and whose post-office address is 25 Askanischerplatz, Dessau, Germany, have invented certain new and useful Improvements in Gas Cooking Apparatus; and I do hereby declare the following to be a full, clear, and exact description of the invention, such as will enable others skilled in the art to which it appertains to make and use the same.

This invention relates to a gas cooking apparatus; and its object is to provide a burner, hot plate, and adjoining grid of such construction that perfectly uniform heating is insured in all parts.

In the drawings, Figure 1 is a longitudinal section; Fig. 2, a plan of the gas cooking apparatus, and Fig. 3 a partial section of the grid.

In gas cooking apparatus furnished with grids the burner is arranged in the middle of the hot plate, and the grid is thus at a considerable distance from the burner. In order, therefore, to insure uniform heating of the whole surface, including plate and grid, it is necessary that the burner, as well as the hot plate and the grid, should be constructed in such a manner that the heating-gases are uniformly distributed.

The improved gas-burner is adapted to meet these conditions, the upper edge of the flared mouth of the mixing-tube $a$ being inclined downward in the direction of the grid $d$, Fig. 1, while the spreader $g$, which is furnished with an indented depending flange $g'$, is held in a horizontal position by means of a pin $i$, loosely inserted in a boss $h$ on the mixing-pipe $a$, so that the burner-openings between the teeth of the overlapping edge or flange $g'$ and the edge of the tube-opening $a'$ gradually increase in size in the direction of the grid. For the purpose of more easily adjusting the burner-openings a screw $k$ is inserted from below in the boss $h$ and serves as a support for the depending pin or shank $i$ on the flame-spreader. By turning the screw $k$ the spreader $g$ is raised or lowered and the burner made correspondingly larger or smaller.

The heating-gases escaping from the burner $a\ g$ naturally have the tendency to pass by the shortest way to the outlet-openings $m$, (to the right in Fig. 1.) Ribs $o$ are therefore arranged radially to the head of the burner for the purpose of distributing the heat as uniformly as possible below the hot plate $n$, by means of which a suitable portion of the heating-gases is conveyed to both sides of the hot plate $n$ and grid $d$. In order also to insure uniform heating of the grid $d$, the various bars $d'$ are constructed so that between each two spaces $r$ in the grid a passage $s$ is formed, which is completely covered in at the top, but entirely open at the bottom and at the end which is toward the burner. This construction of the grid would in itself not suffice for insuring the uniform heating of the bars, as here also the heating-gases have the tendency to reach the outlet $m$ and spaces $r$ by the shortest way, for which reason the spaces or slots $r$ of the grid are partially closed, and, in fact, so that the spaces $r$, which are shortest in the middle of the grid, become gradually longer toward the sides, Fig. 2, and the drawing of the heating-gases to both sides of the grid correspondingly facilitated, whereby the uniform distribution of the heating-gases is promoted.

What I claim, and desire to secure by Letters Patent, is—

1. A gas cooking apparatus comprising a hot plate, a grid forming a continuation of the hot plate, a burner-tube opening below the hot plate and provided with a mouth or burner proper having an inclined upper edge, and a horizontal flame-spreader arranged to coöperate with the inclined burner-mouth to direct the greater portion of the flame toward the grid.

2. A gas cooking apparatus comprising a hot plate, a grid forming a continuation of the hot plate, a burner-tube opening below the hot plate and provided with a mouth or burner proper having an inclined upper edge, a horizontal flame-spreader arranged to coöperate with the inclined burner-mouth to direct the greater portion of the flame toward the grid, and means for adjusting the flame-spreader relatively to the inclined mouth of the burner.

3. A gas cooking apparatus comprising a hot plate, a grid forming a continuation of the hot plate, a burner-tube opening below the hot plate and provided with a mouth or burner proper having an inclined upper edge, an internally-threaded guide-boss in the burner-tube below the mouth thereof, a horizontal flame-spreader arranged over the inclined mouth, a pin or support for the spreader arranged in the guide-boss of the burner-tube, and a screw in said boss adapted to adjust the height of the spreader substantially as described.

4. A gas cooking apparatus comprising a hot plate, radial ribs arranged under the hot plate and adapted to uniformly distribute the heating-gases, a grid forming a continuation of the hot plate, a burner-tube opening below the hot plate and provided with a mouth or burner proper having an inclined upper edge, and a horizontal flame-spreader arranged to coöperate with the inclined burner-mouth to direct the greater portion of the flame toward the grid.

5. A gas cooking apparatus comprising a hot plate, a grid forming a continuation of the hot plate, and consisting of hollow bars arranged to form passages for the hot gases, a burner-tube opening below the hot plate and provided with a mouth or burner proper having an inclined upper edge, and a horizontal flame-spreader arranged to coöperate with the inclined burner-mouth to direct the greater portion of the flame toward the grid.

6. A gas cooking apparatus comprising a hot plate, a grid forming a continuation of the hot plate, and consisting of hollow bars arranged to form passages for the hot gases, and separated by spaces or slots which gradually increase in length from the middle toward the sides, a burner-tube opening below the hot plate and provided with a mouth or burner proper having an inclined upper edge, and a horizontal flame-spreader arranged to coöperate with the inclined burner-mouth to direct the greater portion of the flame toward the grid.

In testimony whereof I have affixed my signature in presence of two witnesses.

LOUIS SCHÖNE

Witnesses:
 HERM. LACK,
 RUDOLPH FRICKE.